(12) United States Patent
Braun et al.

(10) Patent No.: US 10,062,904 B2
(45) Date of Patent: Aug. 28, 2018

(54) SCAFFOLD-FREE 3D POROUS ELECTRODE AND METHOD OF MAKING A SCAFFOLD-FREE 3D POROUS ELECTRODE

(71) Applicant: The Board of Trustees of the University of Illinois, Urbana, IL (US)

(72) Inventors: Paul V. Braun, Savoy, IL (US); Jinyun Liu, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 149 days.

(21) Appl. No.: 15/163,003

(22) Filed: May 24, 2016

(65) Prior Publication Data

US 2016/0351886 A1   Dec. 1, 2016

Related U.S. Application Data

(60) Provisional application No. 62/166,602, filed on May 26, 2015.

(51) Int. Cl.
*H01M 10/00* (2006.01)
*H01M 4/48* (2010.01)
(Continued)

(52) U.S. Cl.
CPC ......... *H01M 4/483* (2013.01); *H01M 4/0421* (2013.01); *H01M 4/131* (2013.01);
(Continued)

(58) Field of Classification Search
CPC .. H01M 10/0525; H01M 4/133; H01M 4/131; H01M 4/134; H01M 4/483;
(Continued)

(56) References Cited

U.S. PATENT DOCUMENTS 6,680,013 B1   1/2004   Stein et al.
7,745,249 B2   6/2010   Lee et al.
(Continued)

OTHER PUBLICATIONS

Braun, P.V. et al., "Electrochemical Fabrication of 3D Microperiodic Porous Materials," *Adv. Mater.* 13, 7 (2001) pp. 482-485.
(Continued)

*Primary Examiner* — Cynthia Harris Kelly
*Assistant Examiner* — Monique M Wills
(74) *Attorney, Agent, or Firm* — Brinks Gilson & Lione

(57) ABSTRACT

A scaffold-free 3D porous electrode comprises a network of interconnected pores, where each pore is surrounded by a multilayer film including a first layer of electrochemically active material, one or more monolayers of graphene on the first layer of electrochemically active material, and a second layer of electrochemically active material on the one or more monolayers of graphene. A method of making a scaffold-free 3D porous electrode includes depositing one or more monolayers of graphene onto a porous scaffold to form a graphene coating on the porous scaffold, and depositing a first layer of an electrochemically active material onto the graphene coating. The porous scaffold is removed to expose an underside of the graphene coating, and a second layer of the electrochemically active material is deposited onto the underside of the graphene coating, thereby forming the scaffold-free 3D porous electrode.

21 Claims, 10 Drawing Sheets

(51) Int. Cl.
| | |
|---|---|
| H01M 10/0525 | (2010.01) |
| H01M 4/133 | (2010.01) |
| H01M 4/131 | (2010.01) |
| H01M 4/134 | (2010.01) |
| H01M 4/04 | (2006.01) |
| H01M 4/1391 | (2010.01) |
| H01M 4/1393 | (2010.01) |
| H01M 4/1395 | (2010.01) |
| H01M 4/38 | (2006.01) |
| H01M 4/485 | (2010.01) |
| H01M 4/505 | (2010.01) |
| H01M 4/525 | (2010.01) |
| H01M 4/58 | (2010.01) |
| H01M 4/02 | (2006.01) |

(52) U.S. Cl.
CPC ........... *H01M 4/133* (2013.01); *H01M 4/134* (2013.01); *H01M 4/1391* (2013.01); *H01M 4/1393* (2013.01); *H01M 4/1395* (2013.01); *H01M 4/38* (2013.01); *H01M 4/485* (2013.01); *H01M 4/505* (2013.01); *H01M 4/525* (2013.01); *H01M 4/5825* (2013.01); *H01M 10/0525* (2013.01); *H01M 2004/021* (2013.01); *H01M 2004/028* (2013.01); *H01M 2004/029* (2013.01)

(58) Field of Classification Search
CPC ..... H01M 2004/021; H01M 2004/028; H01M 4/0421; H01M 4/1391
See application file for complete search history.

(56) References Cited

U.S. PATENT DOCUMENTS

| | | | |
|---|---|---|---|
| 8,237,538 | B2 | 8/2012 | Braun et al. |
| 2004/0195096 | A1 | 10/2004 | Tsamis et al. |
| 2008/0246580 | A1 | 10/2008 | Braun et al. |
| 2008/0261297 | A1 | 10/2008 | Chaffey et al. |
| 2011/0045346 | A1 | 2/2011 | Chiang et al. |
| 2015/0085424 | A1* | 3/2015 | Ozyilmaz ............. C01B 32/182 361/502 |
| 2016/0344010 | A1* | 11/2016 | Zhamu ................ H01M 2/1686 |

OTHER PUBLICATIONS

Braun, P.V. et al., "Electrochemically Grown Photonic Crystals," *Nature* 402 (1999) pp. 603-604.
Cheng, Juanjuan et al., "Hybrid network CuS monolith cathode materials synthesized via facile in situ melt-diffusion for Li-ion batteries", *Journal of Power Sources*, 257 (2014) pp. 192-197.
Guo, Jinxue et al., "Self-assembled 3D $Co_3O_4$-graphene frameworks with high lithium storage performance", *Ionics* (2014) 20:1635-1639; DOI 10.1007/s11581-014-1242-9.
Hao, Qin et al., "Facile Fabrication of a Three-Dimensional Cross-Linking $TiO_2$ Nanowire Network and Its Long-Term Cycling Life for Lithium Storage", *ACS Appl. Mater. Interfaces*, 6 (2014) pp. 10107-10112.
Hu, Chuangang et al., "A powerful approach to functional graphene hybrids for high performance energy-related applications", *Energy & Environ. Sci.*, 7 (2014) pp. 3699-3708.
Huang, Xiao-lei et al., "Dendritic Ni-P-Coated Melamine Foam for a Lightweight, Low-Cost, and Amphipathic Three-Dimensional Current Collector for Binder-Free Electrodes", *Advanced Materials*, 26 (2014) pp. 7264-7270; DOI: 10.1002/adma.201402717.
Jia, Haiping et al., "One-step synthesis of novel mesoporous three-dimensional $GeO_2$ and its lithium storage properties", *J. Mater. Chem. A*, 2 (2014) pp. 17545-17550; DOI: 10.1039/c4ta03933e.
Kang, Jin-Gu et al., "Three-dimensional hierarchical self-supported multi-walled carbon nanotubes/tin(iv) disulfide nanosheets heterostructure electrodes for high power Li ion batteries", *J. Mater. Chem.*, 22 (2012) pp. 9330-9337; DOI: 10.1039/c2jm16248b.
Kong, Dezhi et al., "Three-Dimensional $Co_3O_4$@$MnO_2$ Hierarchical Nanoneedle Arrays: Morphology Control and Electrochemical Energy Storage", *Adv. Funct. Mater.*, 24 (2014) pp. 3815-3826; DOI: 10.1002/adfm.201304206.
Pikul, James H. et al., "High-power lithium ion microbatteries from interdigitated three-dimensional bicontinuous nanoporous electrodes," *Nature Communications*, 4 (2013) pp. 1-5.
Rui, Xianhong et al., "$Li_3V_2(PO_4)_3$ cathode materials for lithium-ion batteries: A review", *Journal of Power Sources*, 258 (2014) pp. 19-38.
Wang, Xinghui et al., "High areal capacity Li ion battery anode based on thick mesoporous $Co_3O_4$ nanosheet networks", *Nano Energy*, 5 (2014) pp. 91-96.
Wu, Qingliu et al., "Insight into the Structural Evolution of a High-Voltage Spinel for Lithium-Ion Batteries", *Chem. Mater.*, 26 (2014) pp. 4750-4756.
Xie, Keyu et al., "Aligned $TiO_2$ nanotube/nanoparticle heterostructures with enhanced electrochemical performance as three-dimensional anode for lithium-ion microbatteries", *Nanotechnology*, 25 (2014) 455401, pp. 1-8.
Yan, Xiaoyan et al., "Construction of three-dimensional porous nano-Ni/NiO nanoflake composite film for electrochemical energy storage", *Materials Letters*, 106 (2013) pp. 250-253.
Yu, X. et al., "Filling Fraction Dependent Properties of Inverse Opal Metallic Photonic Crystals," *Adv. Mater.* 19 (2007) pp. 1689-1692.
Yu, Yan et al., "Three-dimensional porous amorphous $SnO_2$ thin films as anodes for Li-ion batteries", *Electrochimica Acta*, 54 (2009) pp. 7227-7230.
Yuan, Tianzhi et al., "Enhanced lithium storage performance in three-dimensional porous $SnO_2$-$Fe_2O_3$ composite anode films", *Electrochimica Acta*, 136 (2014) pp. 27-32.
Zhang, Huigang et al., "Three-dimensional bicontinuous ultrafast-charge and -discharge bulk battery electrodes," *Nature Nanotechnology*, 6 (2011) pp. 277-281.
Zhuo, Kai et al., "Highly porous dendritic Ni—Sn anodes for lithium-ion batteries", *Journal of Power Sources*, 244 (2013) pp. 601-605.

* cited by examiner

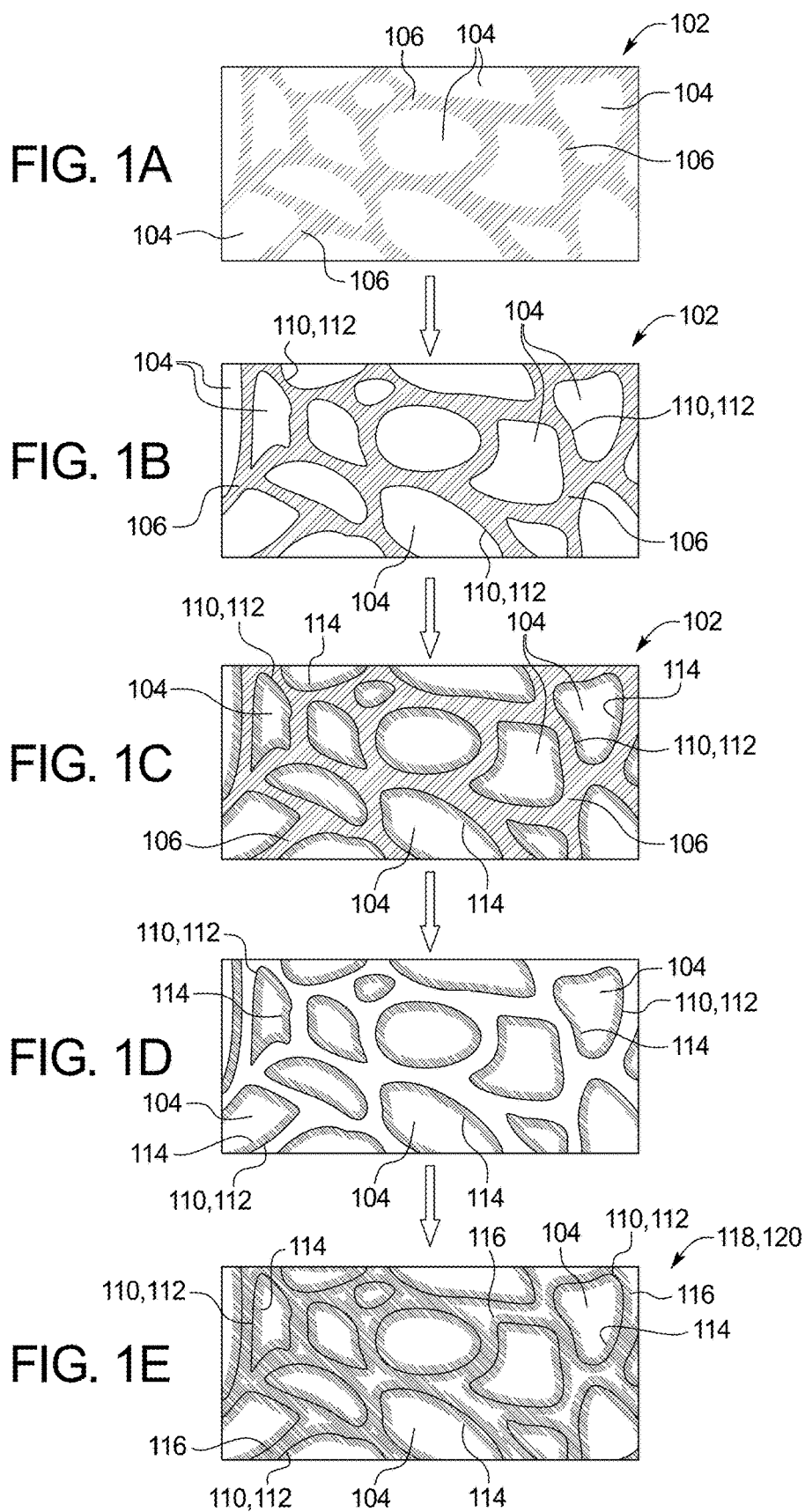

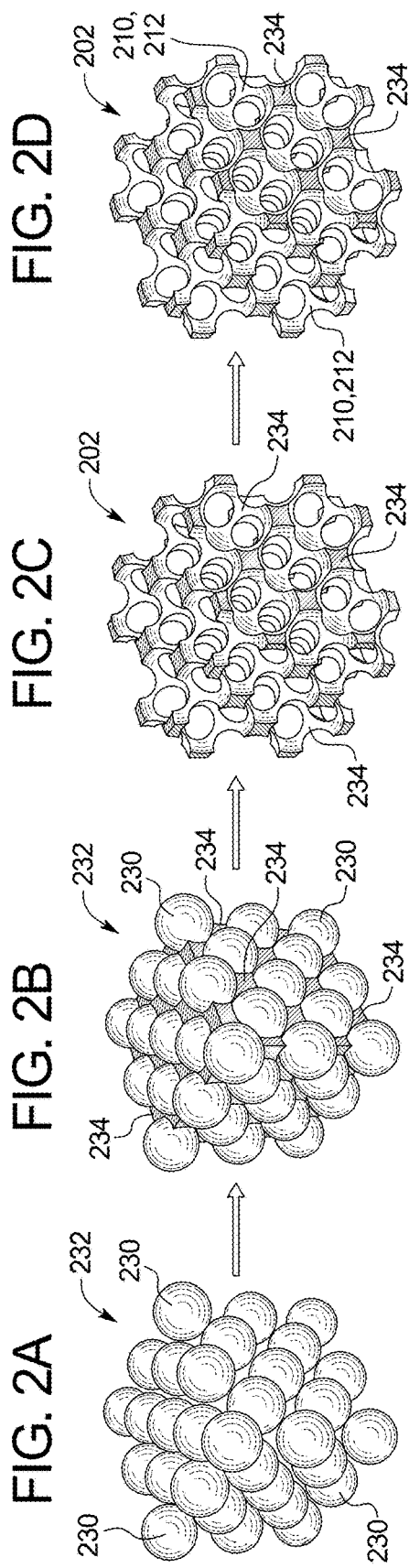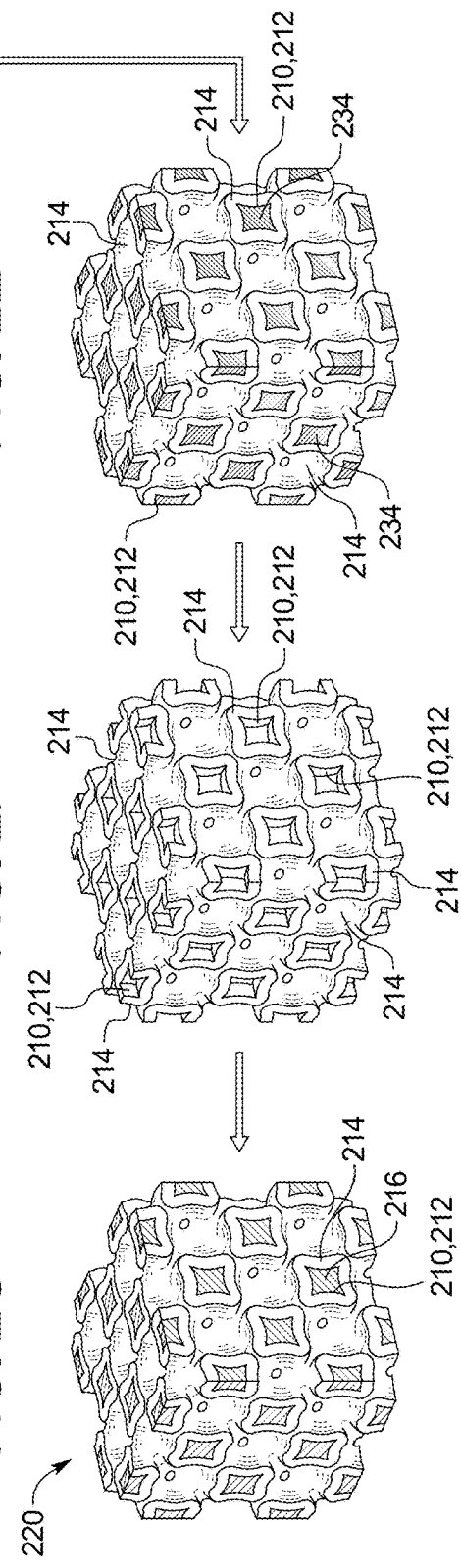

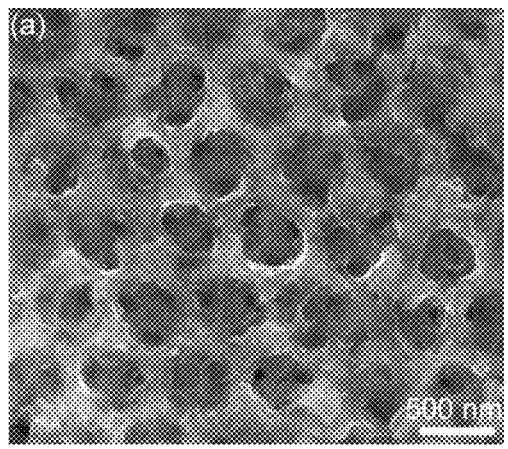 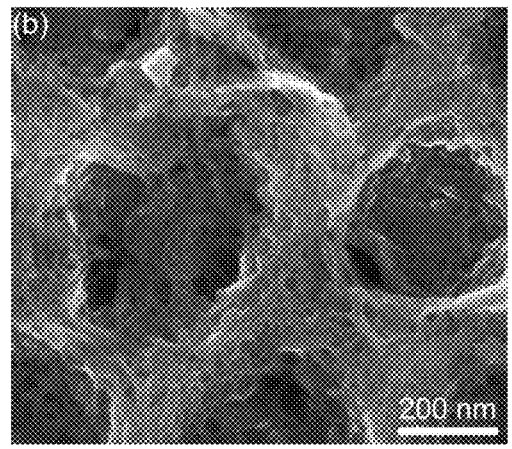
FIG. 6A  FIG. 6B
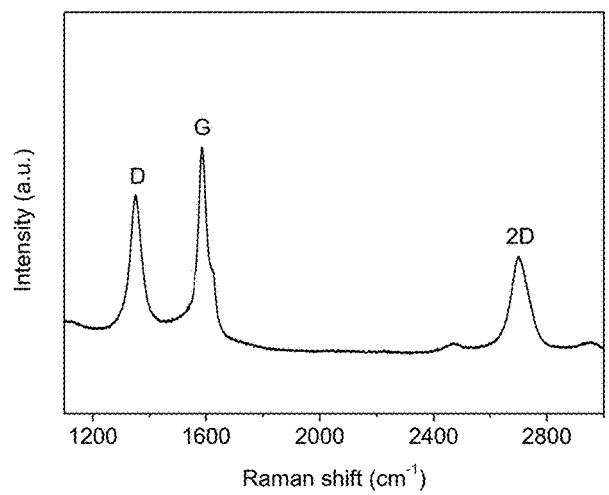
FIG. 6C

SCAFFOLD-FREE 3D POROUS ELECTRODE AND METHOD OF MAKING A SCAFFOLD-FREE 3D POROUS ELECTRODE

RELATED APPLICATIONS

The present patent document claims the benefit of priority under 35 U.S.C. § 119(e) to U.S. Provisional Patent Application Ser. No. 62/166,602, filed on May 26, 2015, which is hereby incorporated by reference in its entirety.

FEDERALLY SPONSORED RESEARCH OR DEVELOPMENT

This invention was made with government support under contract number DE-FG02-07ER46471 awarded by the Department of Energy. The government has certain rights in the invention.

TECHNICAL FIELD

The present disclosure is related generally to energy storage technology and more specifically to rechargeable battery electrodes.

BACKGROUND

Demands for improvements in energy storage have been driven by needs ranging from portable electronics to vehicle electrification, with almost universally, a high energy density, a good cycle life, safety, and acceptable cost being required. Ideally, to achieve a high energy density, the volume fraction of electrochemically active materials in the electrodes is maximized while the volume occupied by electron and ion transport networks is minimized. However, if the ionic and electronic conductivity of the electrode is too low, the rate performance may suffer. Electrodes have been fabricated that provide networks for fast Li ion and electron transport kinetics and short solid-state ion and electron diffusion lengths; however, the fraction of electrochemically active material has generally been lower than desired. For example, in the case of metal foams employed as conductive scaffolds, the mass of the metal can be considerable, lowering the capacity on a full electrode basis.

BRIEF SUMMARY

A scaffold-free 3D porous electrode comprises a network of interconnected pores, where each pore is surrounded by a multilayer film comprising a first layer of electrochemically active material, one or more monolayers of graphene on the first layer of electrochemically active material, and a second layer of electrochemically active material on the one or more monolayers of graphene.

A method of making a scaffold-free 3D porous electrode includes depositing one or more monolayers of graphene onto a porous scaffold to form a graphene coating on the porous scaffold, and depositing a first layer of electrochemically active material onto the graphene coating. The porous scaffold is removed to expose an underside of the graphene coating, and a second layer of electrochemically active material is deposited onto the underside of the graphene coating, thereby forming a scaffold-free 3D porous electrode.

BRIEF DESCRIPTION OF THE DRAWINGS

FIGS. 1A-1E show cross-sectional views of an exemplary fabrication process for a 3D porous electrode, starting from a porous scaffold that is ultimately removed during fabrication.

FIGS. 2A-2G show perspective views of an exemplary fabrication process for a 3D porous electrode, including formation of a porous scaffold that is ultimately removed during fabrication.

FIGS. 6A-6C show SEM images and Raman spectroscopy data from cycled 3D porous cathodes having the $V_2O_5$/graphene/$V_2O_5$ structure.

DETAILED DESCRIPTION

Figure 3A:
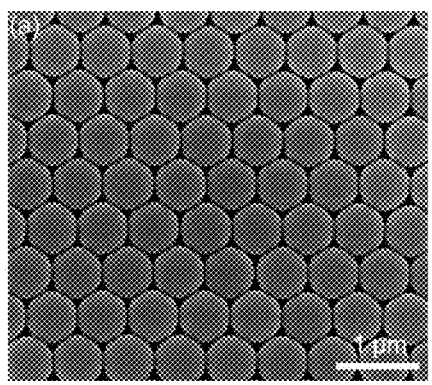
FIGS. 3A-3F show scanning electron microscope (SEM) images of various stages of fabrication of an exemplary 3D porous electrode having a $V_2O_5$/graphene/$V_2O_5$ sandwich structure.

A new Li-ion battery electrode concept has been developed based on a three-dimensional (3D) mesostructure of electrochemically-active materials and graphene. Scaffold-free 3D porous electrodes that combine a high volume fraction of active materials with the good electrical conductivity and low mass of graphene can exhibit high capacities, good cycle stability, and fast charge-discharge kinetics.

To understand the structure of the scaffold-free 3D porous electrode, it is useful to begin with the fabrication process. Somewhat ironically, fabrication of the scaffold-free porous electrode begins with a porous scaffold, which is ultimately removed during fabrication. A porous scaffold may be understood to be a structurally stable and self-supporting 3D framework. FIG. 1A shows a cross-sectional schematic of an exemplary porous scaffold 102, which may include a network of interconnected pores 104 separated by structural elements 106 of the scaffold 102. Such porous scaffolds 102 may be obtained commercially or may be fabricated as described below in a templating process. For example, a porous scaffold 202 formed via templating to have a periodic "inverse opal" structure can be observed in the schematic of FIG. 2C, which shows a perspective view of the exemplary scaffold 202. Generally speaking, suitable porous scaffolds may be electrically conductive and may comprise nickel or another metal, or they may be nonconductive and may comprise $SiO_2$ or another insulating material.

One or more monolayers of graphene 110 are deposited onto the porous scaffold 102 by a process such as chemical vapor deposition (CVD), thereby forming a graphene coating 112, as shown schematically in FIG. 1B. Other suitable deposition methods for the graphene coating 112 may include electrochemical deposition and atomic layer deposition. The graphene coating 112 may be a conformal graphene coating that covers most or all of the surface of the porous scaffold 102. As would be known to those skilled in the art, a monolayer of graphene can be described as a two-dimensional material having a single layer of $sp^2$-bonded carbon atoms. Thus, a graphene coating including one or more monolayers of graphene may have a nanoscale thickness which is well below about 100 nm, and is typically below about 20 nm or below about 10 nm. During deposition, the one or more monolayers of graphene 110 may penetrate and conformally coat part or all of the surface of the porous scaffold 102. The graphene coating 112 may thus have a 3D, nonplanar geometry that mirrors the surface of the porous scaffold 102.

Referring to FIG. 1C, a first layer 114 of an electrochemically active material is deposited onto the graphene coating 112 using a solvothermal growth process or another suitable deposition method, such as electrochemical deposition or atomic layer deposition. Since maximizing the volume fraction of active material in the porous electrode is desirable, the first layer 114 of the electrochemically active material may have a thickness larger than that of the graphene coating 112. For example, the thickness of the first layer 114 of the electrochemically active material may be from about 5 to 20,000 times larger than that of the graphene coating 112. Typically, the thickness of the first layer 114 is from about 20 to 1,000 times larger than that of the graphene coating 112. In the case of a porous cathode, suitable electrochemically active materials may include, for example $V_2O_5$, lithiated MnOOH, cobalt oxide, lithium cobalt oxide, lithium nickel cobalt aluminum oxide, lithium nickel manganese cobalt oxide, lithium iron phosphate, lithium vanadium phosphate, vanadium(IV) oxide, and/or iron fluoride. If a porous anode is desired, the electrochemically active material may include silicon, tin, iron oxide, copper oxide, tin oxide, nickel phosphide, titanium oxide, a nickel-tin alloy, and/or a copper-tin alloy.

Referring to FIG. 1D, the porous scaffold 102 may then be removed, thereby exposing an underside of the graphene coating 112. Removal of the porous conductive scaffold 102 may be carried out via an etching process using an etchant that does not damage or remove the graphene monolayer(s) 110. For example, in the case of a porous Ni scaffold, etching may be carried out using an aqueous solution of iron chloride ($FeCl_3$) and hydrochloric acid (HCl), followed by a heating step. Prior to removing the porous scaffold 102, the first layer 114 of the electrochemically active material may be heat treated at a temperature sufficient to induce crystallization, sintering, and/or an increase in mechanical integrity thereof. Accordingly, when the porous scaffold 102 is removed, the active material coated-graphene structure (i.e., the graphene coating 112 and the first layer 114 of electrochemically active material) has sufficient structural stability to avoid collapse. The heat treating of the electrochemically active material may be carried out at a temperature in the range from about 200° C. to about 900° C.

FIG. 1E shows deposition of a second layer 116 of the electrochemically active material onto the exposed underside of the graphene coating 112, thereby forming a mesostructure 118 including one or more monolayers of graphene sandwiched between the first and second layers 114,116 of electrochemically active material. The second layer 116 may be deposited using a solvothermal growth process or another suitable deposition method, such as electrochemical deposition or atomic layer deposition. During deposition of the second layer 116 on the underside of the graphene coating 112, an additional amount of electrochemically active material may be deposited on the first layer 114, thereby simultaneously increasing the thickness of the first layer 114 of electrochemically active material. After deposition, the second layer 116 (and any additional electrochemically active material on the first layer 114) may be heat treated at a temperature sufficient to induce crystallization, sintering, and/or an increase in mechanical integrity thereof. The heat treating may be carried out at a temperature in the range from about 200° C. to about 900° C., as described above.

Also as described above for the first layer 114 of electrochemically active material, the second layer 116 may have a thickness larger than that of the graphene coating 112. For example, the thickness of the second layer 116 of the electrochemically active material may be from 5 to 20,000 times larger than that of the graphene coating. Typically, the thickness of the second layer 116 is from about 20 to 1,000 times larger than that of the graphene coating 112. Suitable electrochemically active materials for the second layer 116 may include, in the case of a porous cathode, $V_2O_5$, lithiated MnOOH, cobalt oxide, lithium cobalt oxide, lithium nickel cobalt aluminum oxide, lithium nickel manganese cobalt oxide, lithium iron phosphate, lithium vanadium phosphate, vanadium(IV) oxide, and/or iron fluoride. If a porous anode is desired, the electrochemically active material may include silicon, tin, iron oxide, copper oxide, tin oxide, nickel phosphide, titanium oxide, a nickel-tin alloy, and/or a copper-tin alloy. The electrochemically active material selected for the second layer 116 may be the same as or different than the electrochemically active material used for the first layer 114. Also, due to the processing sequence explained above, the first layer 114 of electrochemically active material may have a larger thickness than the second layer 116 of electrochemically active material.

The above-described fabrication method enables the formation of a scaffold-free 3D porous electrode 120 that includes, referring again to FIG. 1E, a network of pores 104, each pore 104 being surrounded by a multilayer film comprising a first layer 114 of electrochemically active material, one or more monolayers of graphene 110 on the first layer of electrochemically active material, and a second layer 116 of electrochemically active material on the one or more monolayers of graphene 110.

The schematics of FIGS. 2A-2B are used in conjunction with the micrographs of FIGS. 3A-3F to discuss fabrication of an exemplary 3D porous electrode in which (a) $V_2O_5$ is used as the electrochemically active material and (b) a templating process is used to form the porous scaffold. The 3D porous electrode fabricated in this example includes a $V_2O_5$/graphene/$V_2O_5$ mesostructure in which several monolayers of graphene are sandwiched between sub-100 nm layers of $V_2O_5$.

Figure 3B:
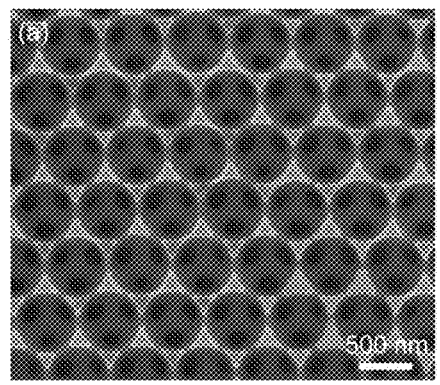

In this example, the first steps in the process entail formation of the porous scaffold. FIGS. 2A-2C show the fabrication of a porous scaffold in a templating process from a suspension of polystyrene (PS) particles or spheres. The PS spheres 230 are self-assembled into a face-centered cubic lattice using methods known in the art and then sintered (e.g., at 95° C. for 2.5 h). A robust lattice of interconnected particles, which may be referred to as PS opal or an opal template 232, is thus formed, as shown in FIGS. 2A and 3A. In a next step, the PS opal 232 is infiltrated with a conductive material (e.g., Ni) 234 in an electrodeposition process, as shown schematically in FIG. 2B. After infiltration, the opal template 232 may be removed by exposure to an etchant (e.g., by soaking in toluene) such that only the infiltrated conductive material 234 remains. Thus, a porous scaffold 202 having a 3D porosity determined by the opal template 232 may be formed, as shown in FIGS. 2C and 3B.

Figure 3C:
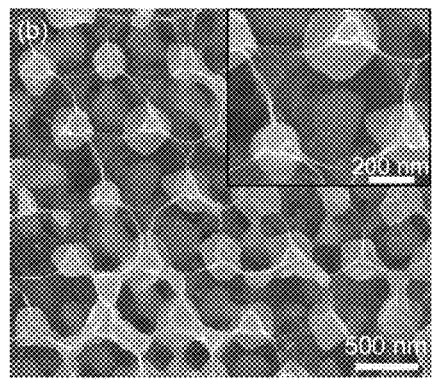
Figure 3D:
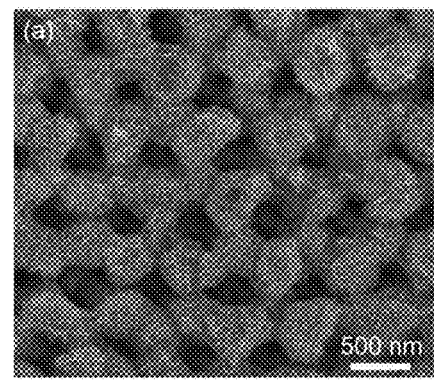
Figure 3E:
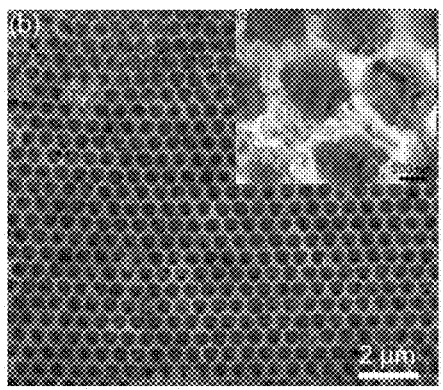
Figure 3F:
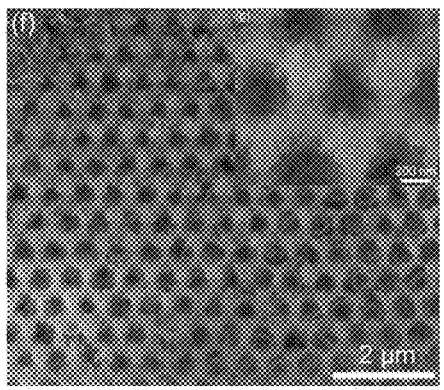

Referring now to FIGS. 2D and 3C, several monolayers of graphene 210 are grown on the porous scaffold 202 via chemical vapor deposition (CVD) to form a graphene coating 212, which may be a conformal graphene coating as shown. A first layer 214 of $V_2O_5$ is then solvothermally grown onto the graphene coating 212, followed by heat treatment, as shown in FIGS. 2E and 3D. The porous scaffold 202 is removed by etching (FIGS. 2F and 3E), and then another $V_2O_5$ layer 216 is grown on an exposed underside of the graphene coating 212 and is thermally treated, as illustrated in FIGS. 2G and 3F. Also shown is deposition of an additional amount of the electrochemically active material ($V_2O_5$) on the first $V_2O_5$ layer 114 when the second $V_2O_5$ layer 116 is deposited on the underside of the graphene coating 112. X-ray diffraction confirms that the $V_2O_5$ layers crystallize upon heat treatment to form the orthorhombic $V_2O_5$ phase (space group: Pmmn). A scaffold-free, 3D porous electrode 220 having a sandwich nanoarchitecture is thus formed.

Figure 4A:
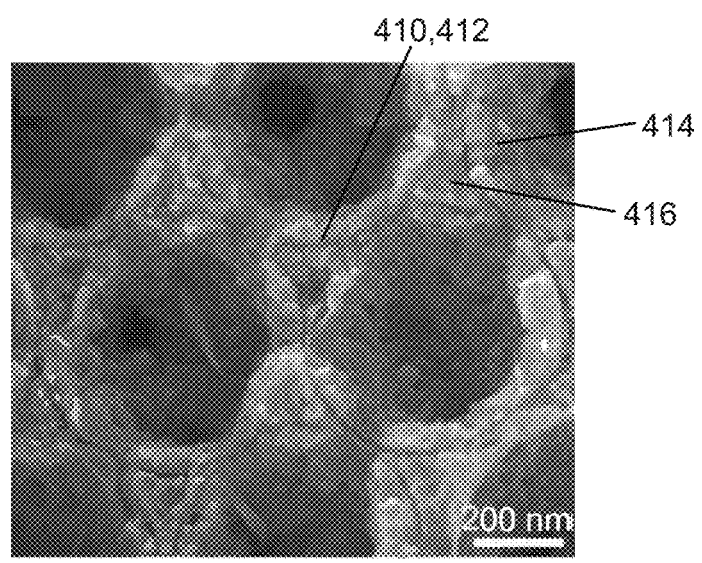
FIGS. 4A and 4B show a high-magnification SEM image of the 3D porous cathode of FIG. 3F and a Raman spectrum from the $V_2O_5$/graphene/$V_2O_5$ structure.
Figure 4B:
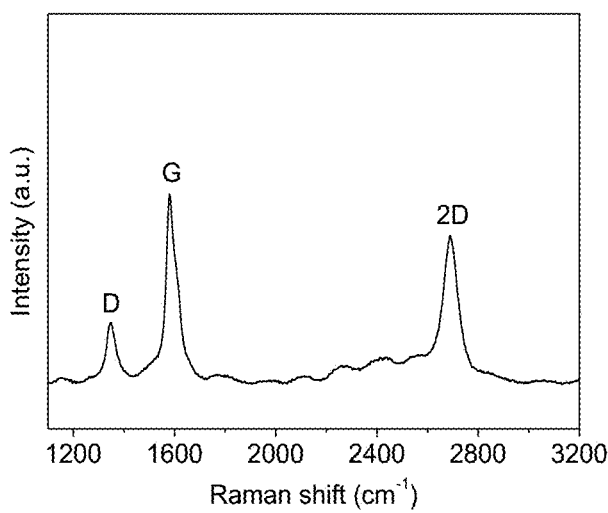

The high-magnification SEM image of FIG. 4A shows a cross-sectional view of the $V_2O_5$/graphene/$V_2O_5$ sandwich structure. The right half of the image highlights the sandwich structure (first-growth $V_2O_5$ 414, second-growth $V_2O_5$ 416 after Ni etching, and the intermediate graphene layer 410,412). FIG. 4B shows a Raman spectrum of the $V_2O_5$/graphene/$V_2O_5$ structure. The peaks at about 1350, 1580, and 2700 $cm^{-1}$ can be assigned to the characteristic D, G, and 2D peaks of graphene. Raman spectroscopy data collected from different positions indicate good graphene uniformity and, in conjunction with transmission electron microscope (TEM) images, show that the graphene is from 4 to 10 monolayers in thickness. The graphene content of the exemplary sandwich structure is determined to be at most 3.6 wt. % using thermogravimetric analysis. The $V_2O_5$ layers are approximately 60 nm in thickness.

The 3D-structured graphene embedded inside the porous cathode provides good electric conductivity for fast electron transport, which is important since $V_2O_5$ possesses a relatively low electrical conductivity (about $10^{-2}$-$10^{-3}$ S $cm^{-1}$). The mesostructured design helps to keep solid-state diffusion lengths short, which is advantageous since $V_2O_5$ exhibits a low Li ion diffusion coefficient (about $10^{-13}$-$10^{-12}$ $cm^2$ $s^{-1}$). The low mass and volume fraction of the graphene scaffold also enables maximization of the volume and mass fraction of the electrochemically active material(s) within the electrode. While the voltage of $V_2O_5$ vs. Li is only 2 to 3.5 V, the high theoretical capacity of $V_2O_5$ (442 mA h $g^{-1}$ for three Li ion insertions per $V_2O_5$ unit formula and 294 mA h $g^{-1}$ for two ion insertions) provides potential for a good energy density.

To maximize the volume of electrochemically active material for a given scaffold geometry, the thickness of each active material layer may be optimized. Typically, each of the first and second layers 114,116 of electrochemically active material has a thickness of at least about 50 nm, or at least about 10 nm, and the thickness may be as large as 20 microns. As described above, the thickness of each of the electrochemically active material layers 114,116 may be from 5 to 20,000 times that of graphene coating. Adjacent pores may comprise shared second layers 116 of electrochemically active material, as can be seen in FIG. 1E and FIG. 4A. Each of the first and second layers 114,116 of electrochemically active material may be crystalline (e.g., polycrystalline). In some cases, the first and second layers 114,116 of electrochemically active material may have a nanocrystalline structure with an average crystallite or grain size of about 100 nm or less (e.g., from about 1 nm to about 100 nm, or from about 1 nm to about 50 nm). The electrochemically active material may be selected as described above and elsewhere in this disclosure depending on whether the 3D porous electrode is intended for use as a cathode or an anode.

The graphene coating 112 that includes one or more monolayers of graphene has a thickness of about 100 nm or less, and more typically the thickness of the graphene coating is about 10 nm or less, or 5 nm or less. The minimum thickness may correspond to the thickness of a single monolayer, which is in the range from 0.1 nm to about 0.5 nm. Thus, in many examples the thickness of the one or more monolayers of graphene ranges from about 0.1 nm to about 5 nm, or from about 0.1 nm to about 10 nm. The thickness may be highly uniform with a spatial variation of about 50% or less or about 25% or less.

As described above, a porous scaffold 102,202 may be employed during fabrication of the porous electrode 120,220 but is ultimately removed. Accordingly, the multilayer film that includes the first and second layers 114,116 of electrochemically active material and the monolayer(s) of graphene 110 is not attached to a porous scaffold in the final fabricated 3D porous electrode 120,220. The network of pores in the 3D porous electrode may comprise interconnected pores. The pores may have an average size in the range from about 20 nm to 20 microns. The 3D porous electrode may have a height or thickness determined by the size of the porous scaffold used for fabrication. Typically, the 3D porous electrode has a thickness in the range of from about 5 microns to about 150 microns.

A rationale for fabricating the sandwich structure may be understood by considering the structure formed prior to deposition of the second layer of electrochemically active material. Referring again to the example described above (with $V_2O_5$ as the electrochemically active material): After a heat treatment to crystallize the $V_2O_5$ and etching to remove the porous scaffold (Ni inverse opal), a scaffold-free graphene/$V_2O_5$ structure is formed that includes hollow spaces previously occupied by electrodeposited nickel. This graphene/$V_2O_5$ electrode may exhibit a good rate performance; however, the volume normalized capacity is typically low given the low volume fraction of active material. By depositing a second layer of electrochemically active material, a $V_2O_5$/graphene/$V_2O_5$ structure is formed with a significantly higher volume fraction of $V_2O_5$.

Figure 5A:
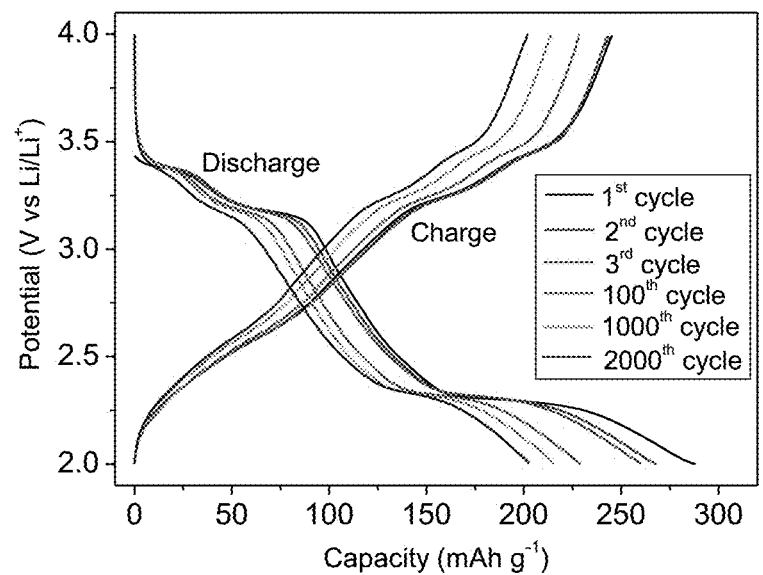
FIGS. 5A-5E present electrochemical data for an exemplary 3D porous cathode having the $V_2O_5$/graphene/$V_2O_5$ structure.
Figure 5B:
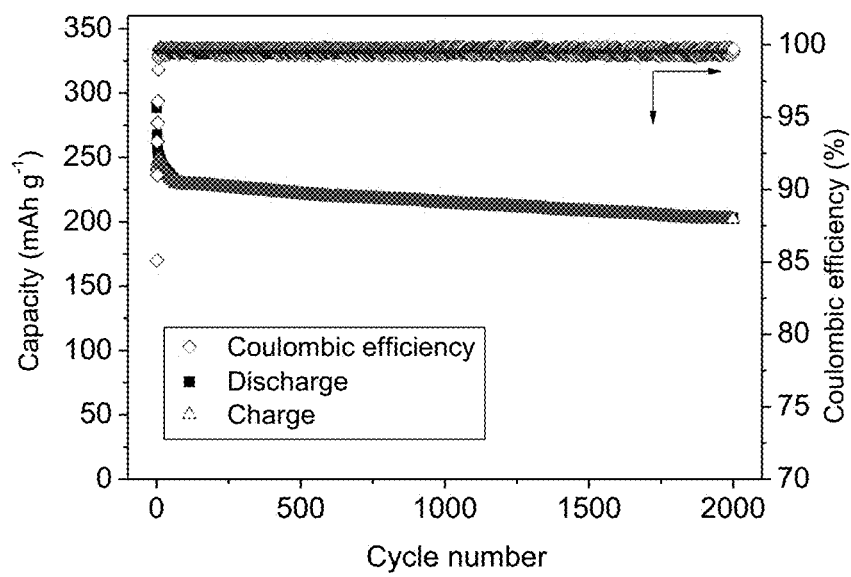
Figure 5C:
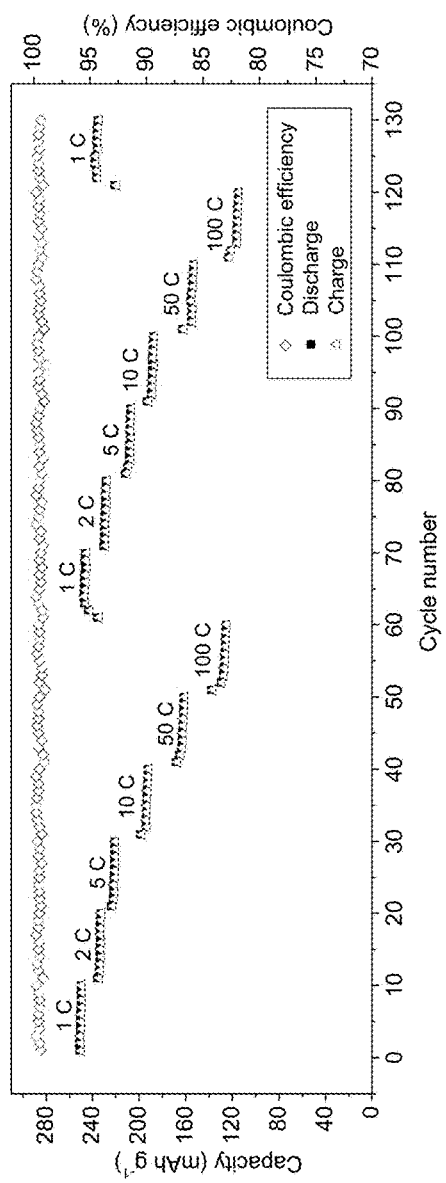
Figure 5E:
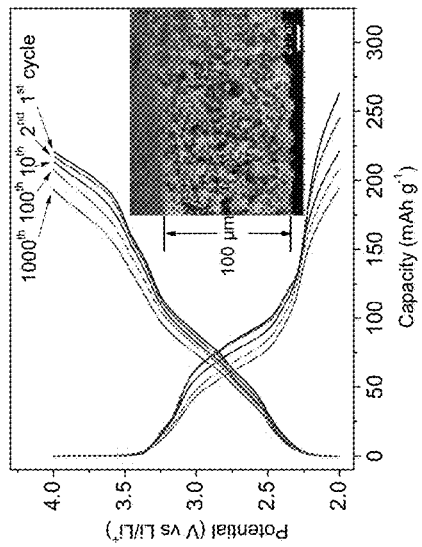
Figure 5D:
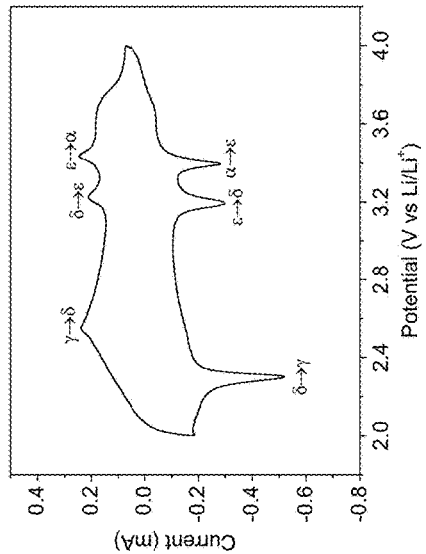

FIGS. 5A-5E present electrochemical data for the exemplary $V_2O_5$/graphene/$V_2O_5$ cathodes. FIG. 5A shows galvanostatic charge-discharge curves of $V_2O_5$/graphene/$V_2O_5$ cathodes at 5 C. Similar to some other reports, 1 C corresponds to complete charge or discharge of the two electron theoretical capacity of 294 mA h $g^{-1}$, not to the theoretical three electron 442 mA h $g^{-1}$ capacity, given the difficulty in exploiting the full three electron process. Plateaus at about 3.4, 3.2, and 2.3 V during discharge, as shown in FIG. 5A, indicate a multi-step Li ion intercalation ($V_2O_5$+x $Li^+$⇌$Li_xV_2O_5$), which may be attributed to the phase transitions from α-$V_2O_5$ to ε-$Li_{0.5}V_2O_5$, then to δ-$LiV_2O_5$ and final to γ-$Li_2V_2O_5$. The plateaus at ca. 2.5, 3.2, and 3.4 V during charge correspond to the reverse processes going from γ-$Li_2V_2O_5$ to δ-$LiV_2O_5$ to ε-$Li_{0.5}V_2O_5$ and then α-$V_2O_5$. Those phase transformations during both cathodic and anodic processes are also confirmed by cyclic voltammetry (CV) on the $V_2O_5$/graphene/$V_2O_5$ cathodes; FIG. 5D shows a CV curve of the $V_2O_5$/graphene/$V_2O_5$ cathode over the potential range of 2 to 4 V vs. Li/$Li^+$ at a scan rate of 0.1 mV $s^{-1}$.

FIG. 5B shows cycling capacity and Coulombic efficiency of the $V_2O_5$/graphene/$V_2O_5$ cathodes over 2000 cycles, where all capacities are on a full electrode basis, and FIG.

5C shows capacity and Coulombic efficiency at varying C-rates. The electrode is pre-cycled 20 times at 1 C before starting the measurements. The 6 μm-thick $V_2O_5$/graphene/$V_2O_5$ cathode exhibits a gravimetric capacity (full electrode basis) of about 230 mAh $g^{-1}$ at 5 C after 200 cycles. Impressively, after 2000 cycles, the capacity has only faded to about 203 mAh $g^{-1}$ and the Coulombic efficiency is ~99.7%. At 100 C, the capacity is about 125 mAh $g^{-1}$. When the rate is returned back to 1 C after 100 C cycling, the capacity returns, indicating the electrode is not damaged by the high C-rate cycling. Over various C-rates, the Columbic efficiency remains at about 99.2% to 99.8%. Importantly, the structure is mechanically-robust, preventing loss of active nanomaterials and collapse during long-term cycling. SEM images and Raman spectroscopy data collected from the cycled electrodes and shown in FIGS. 6A-6C confirm the stability of the structure.

Commercial electrodes may be much thicker than 6 μm, and thus it is useful to evaluate the performance of a thicker electrode. 100 μm-thick $V_2O_5$/graphene/$V_2O_5$ cathodes are fabricated using a commercially available disordered mesostructured Ni scaffold as a sacrificial template. The 3D porous cathodes, fabricated as illustrated in FIGS. 1A-1E, are assembled into coin cells. FIG. 5E shows the first, second, $10^{th}$, $100^{th}$, and $1000^{th}$ discharge-charge curves (at a rate of 5 C) for the thick cathode structure, which is shown in the cross-sectional SEM image in the inset. The 100 μm-thick $V_2O_5$/graphene/$V_2O_5$ cathode exhibits a capacity of about 198 mAh $g^{-1}$ over 1000 cycles with a Coulombic efficiency of ~99.5%, nearly matching the performance of the exemplary thin electrode system.

It is also instructive to compare the electrochemical performance of the 6 μm-thick $V_2O_5$/graphene/$V_2O_5$ cathode with a $V_2O_5$-coated Ni inverse opal cathode. In other words, an exemplary scaffold-free 3D porous electrode having a sandwich architecture ($V_2O_5$/graphene/$V_2O_5$) is compared with a scaffold-based electrode containing only a single active material layer (Ni/$V_2O_5$). The 3D Ni/$V_2O_5$ cathodes are fabricated using similar procedures as used for the $V_2O_5$/graphene/$V_2O_5$ cathodes. The Ni/$V_2O_5$ cathodes exhibit stable cycling performance with a high Columbic efficiency (>99%) over 500 charge-discharge cycles, and well-defined phase plateaus in both charge and discharge processes. However, since the Ni scaffold is heavy, the mass fraction of active materials within the electrode is relatively low and thus the full electrode basis capacity is only 80 mAh $g^{-1}$ after 500 cycles, less than half of the full electrode capacity of the $V_2O_5$/graphene/$V_2O_5$ cathode (about 203 mAh $g^{-1}$ after 2000 cycles).

Figure 7A:
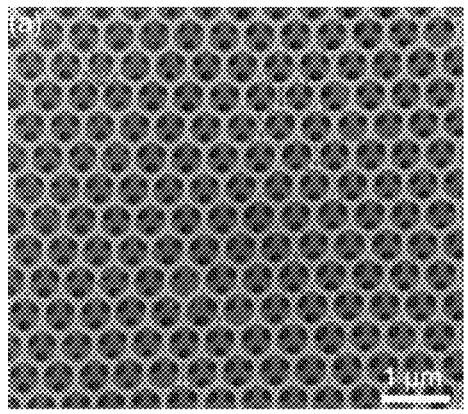
FIGS. 7A-7H show SEM images and Raman spectroscopy data from a 3D porous anode having a graphene/Si/graphene structure.
Figure 7B:
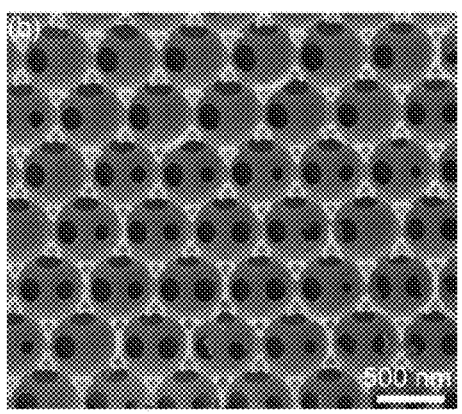
Figure 7C:
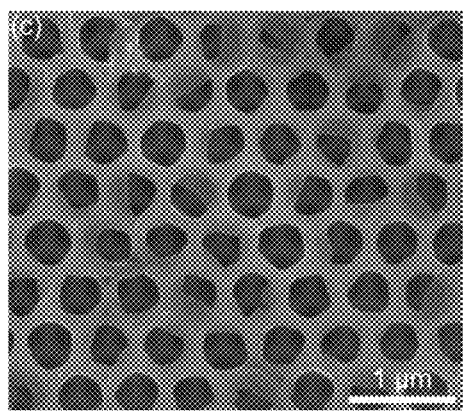
Figure 7D:
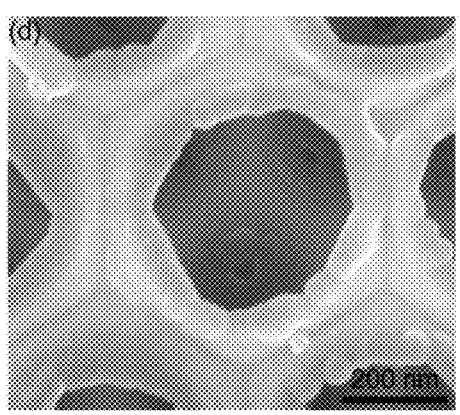
Figure 7E:
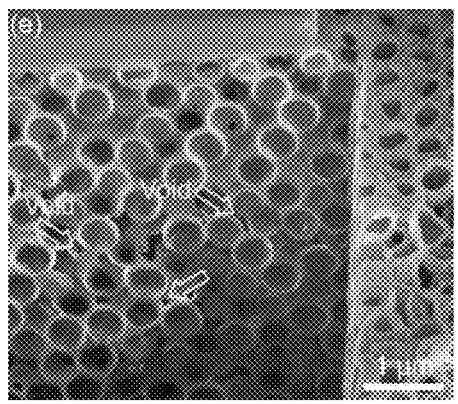
Figure 7F:
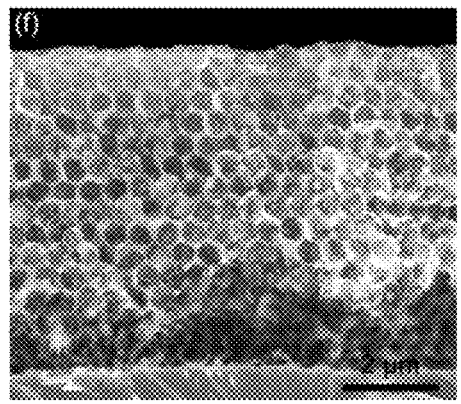
Figure 7G:
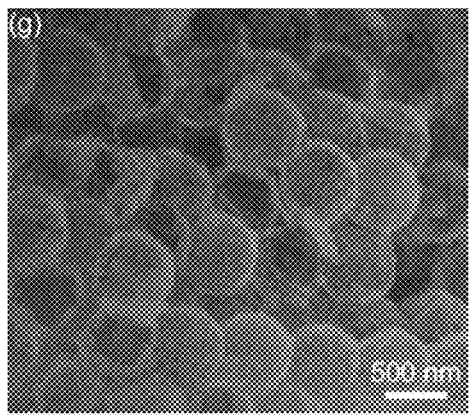
Figure 7H:
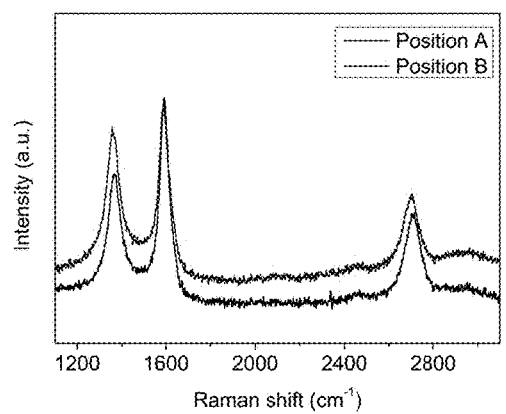

To demonstrate the generality of the 3D graphene sandwich-structured electrode concept, a graphene/Si/graphene anode is fabricated. Si anodes are of great interest due to the high theoretical capacity of silicon (~4200 mAh $g^{-1}$). However, the large volume change of Si (~300%) during lithiation-delithiation often leads to fracture and continuous solid electrolyte interphase (SEI) layer formation, and thus a rapid capacity decay. Here, Si (or another electrochemically active material, as described above) is coated by graphene on both sides, forming a graphene/active material/graphene sandwich structure. Briefly, starting with a PS opal-templated $SiO_2$ inverse opal, Si CVD is used to form a $SiO_2$/Si structure, as shown in the micrographs of FIGS. 7A-7D. Reactive ion etch (RIE) removes the top Si layer, exposing the $SiO_2$ opal, which is subsequently etched with HF, forming a 3D Si inverse opal with numerous hollow junctions, as shown in FIG. 7E. Finally, a solid precursor-based CVD method is employed to grow graphene on all exposed Si surfaces, yielding the graphene/Si/graphene anode structure, as shown in FIGS. 7F and 7G. A Raman spectrum obtained from the structure is shown in FIG. 7H.

Figure 7I:
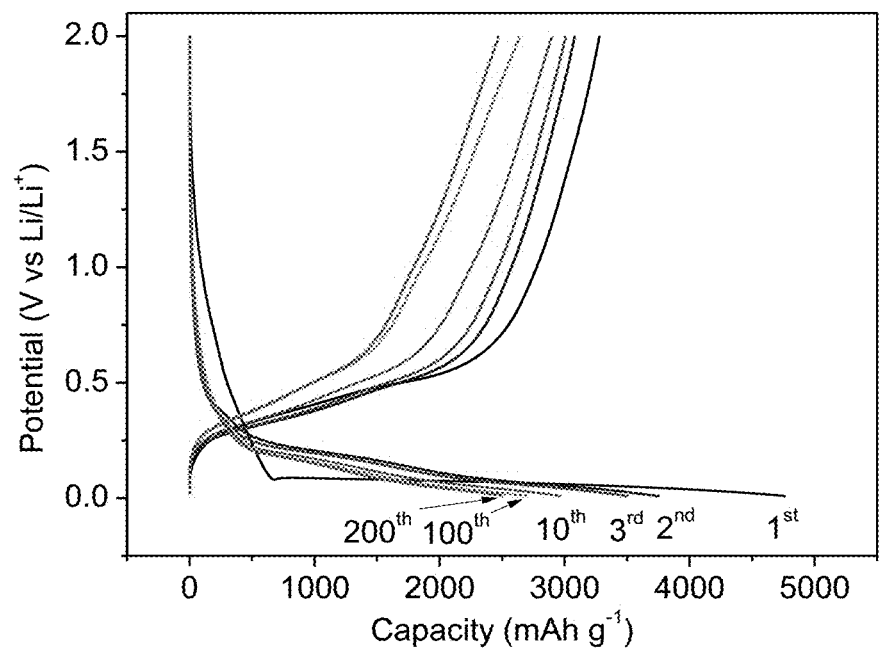
FIGS. 7I and 7J show the electrochemical performance of the 3D porous anode of FIGS. 7A-7G.
Figure 7J:
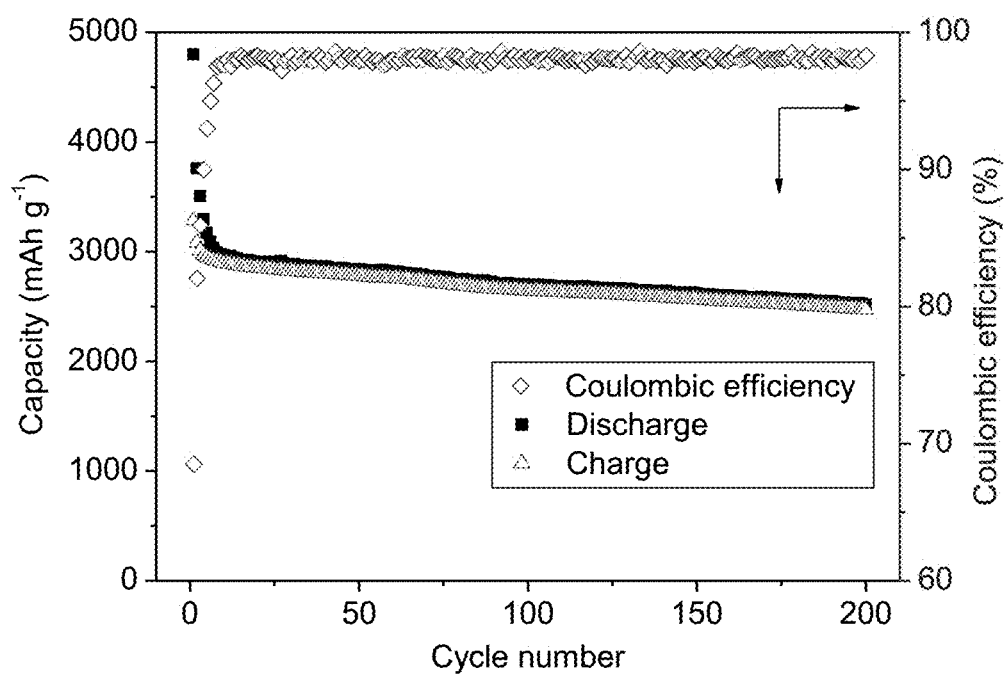

FIGS. 7I and 7J show the electrochemical performance of the graphene/Si/graphene anode. The long plateau during the first discharge can be assigned to the reaction between Si and Li-ion to form $Li_xSi$, in good agreement with previous reports. The high first discharge capacity (~4800 mAh $g^{-1}$) which exceeds the 4200 mAh $g^{-1}$ theoretical capacity of Si, is probably caused by the SEI formation. In the second cycle, the discharge and charge capacities are ~3760 and 3085 mAh $g^{-1}$, and the Coulombic efficiency is about 82%. After 200 charge-discharge cycles at 0.4 C, the discharge and charge capacities are about 2515 and 2475 mAh $g^{-1}$, respectively, about six times of the theoretical capacity of a carbon-based anode (372 mAh $g^{-1}$), and the Coulombic efficiency is stable at around 98%. It is believed that the good performance of this anode is due to the two graphene coatings, which improve the anode electronic conductivity and may protect the SEI from damage during lithiation-delithiation, as well as the porous nature of the anode, which provides space for the Si to expand during lithiation.

The scaffold-free 3D porous electrodes described herein provide a design concept for Li-ion battery electrodes with high capacities, long cycling lives, and good rate performances. The exemplary $V_2O_5$/graphene/$V_2O_5$ cathode provides a full electrode basis capacity of about 230 mAh $g^{-1}$ at 5 C after 200 cycles, and ~203 mAh $g^{-1}$ after 2000 cycles, with a Coulombic efficiency of ~99.7%. Even at 100 C, the capacity is ~125 mAh $g^{-1}$. The exemplary graphene/Si/graphene electrode exhibits, after 200 charge-discharge cycles at 0.4 C, a capacity of about 2500 mAh $g^{-1}$, many times the capacity of a commercial graphite-based anode.

EXAMPLES

Fabrication of Scaffold-Free 3D Porous Cathode

Fabrication of Porous Scaffold Via Templating Process: Face-centered cubic lattices of polystyrene (PS) particles ("PS opals") are used to fabricate porous conductive scaffolds in a templating process described previously (e.g., as described in U.S. Pat. No. 8,237,538, "Porous Battery Electrode for Rechargeable Battery and Method of Making the Electrode," issued on Aug. 7, 2012, which is hereby incorporated by reference in its entirety), with the modifications noted below. Since PS opals are used as templates in this example, the porous conductive scaffolds may be referred to as "inverse opals," or, more specifically, "Ni inverse opals" since the porous conductive scaffolds comprise electrodeposited nickel.

1 cm×2 cm, 0.25 mm thick tungsten foils (≥99.9% trace metals basis, Sigma-Aldrich) are employed as substrates. Before PS opal assembly, tungsten substrates are cleaned by sonication in acetone, ethanol, and Millipore water for 20 min each. PS spheres (600 nm diameter, Molecular Probes) are dispersed in Millipore water to form a 0.2 wt. % suspension. After blow drying with air, the substrates are placed vertically into vials containing the PS suspension at 55° C. To enhance bonding between PS spheres, the resultant PS opal is sintered at 95° C. for 2.5 h. Subsequently, in a two electrode system using a PS opal-coated tungsten foil as a working electrode and a platinum foil as a counter electrode, Ni is electrodeposited from a commercial electroplating solution (Techni Nickel S, Technic Corp.). The sample is subsequently soaked in toluene to dissolve the PS, forming a Ni inverse opal which may be about 6 μm in height or thickness with respect to the working electrode.

The Ni inverse opal is cleaned by ethanol and then Millipore water, and dried in an oven.

Deposition of Graphene onto Porous Scaffold: A one-step low temperature graphene deposition method is employed by using an Atomate hot-wall CVD system. The Ni inverse opal is annealed at 670° C. for 15 min using a ramp rate of 15° C. min$^{-1}$ under 400 sccm $H_2$. Then, graphene is grown on the Ni inverse opal at 670° C. for 30 min under a mixture of 15 sccm $C_2H_4$ and 90 sccm $H_2$ at an operating pressure of ~0.5 Torr. Finally, the graphene-coated porous scaffold is cooled to room temperature at a rate of 10° C. min$^{-1}$ under 500 sccm of Ar.

Deposition of First Layer of Electrochemically Active Material: $V_2O_5$ is grown on the graphene-coated Ni inverse opal via a solvothermal approach. 0.08 mL vanadium(V) oxytriisopropoxide (Sigma-Aldrich) is dispersed into 35 mL isopropanol by stirring for 20 min. The solution is transferred into a 50 mL Teflon-lined steel autoclave. A graphene-coated Ni inverse opal on a tungsten substrate is placed into the solution face up. The autoclave is sealed, heated at 180° C. for 20 h and then cooled naturally to room temperature. The $V_2O_5$-coated sample is removed, washed thoroughly with ethanol and Millipore water, and dried at 60° C. for 4 h. The $V_2O_5$-coated sample is then held in a tube furnace at 350° C. for 2.5 h in air using a ramp rate of 5° C. min$^{-1}$. The heat treatment induces crystallization of the $V_2O_5$.

Removal of Porous Scaffold and Deposition of Second Layer of Electrochemically Active Material: The Ni template is etched by immersing the Ni/graphene/$V_2O_5$ structure into a 30 mL aqueous solution of 1M $FeCl_3$ and 1 M HCl, followed by heating at 60° C. for 5 h. After thorough washing with Milipore water, and drying at 60° C. for 4 h, a second solvothermal growth was conducted to deposit another $V_2O_5$ layer into the structure using the same conditions as the first $V_2O_5$ growth, including the heat treatment. The resulting cathode structure ($V_2O_5$/graphene/$V_2O_5$) is approximately 6 μm in height (or thickness), which is consistent with the size of the porous scaffold used for fabrication. A thicker cathode structure (also $V_2O_5$/graphene/$V_2O_5$) is formed starting with a ~100 μm-thick porous Ni scaffold and following similar procedures as described above for the ~6 μm cathode structure.

Fabrication of Scaffold-Free 3D Porous Anode

Anode Fabrication: To form a graphene/Si/graphene anode, Si is deposited on a $SiO_2$ inverse opal via CVD, and then the $SiO_2$ template is removed. A solid precursor-based CVD method is used to deposit graphene onto the Si inverse opal, forming the graphene/Si/graphene structure.

In greater detail, the procedure includes PS opal template assembly, $SiO_2$ inverse opal fabrication, Si coating on $SiO_2$, $SiO_2$ scaffold removal, and the graphene CVD on the Si inverse opal. The $SiO_2$ inverse opal was used as template for Si CVD since the graphene CVD is conducted after $SiO_2$ removal.

1) Assembly of the PS opal is carried out as described above.

2) $SiO_2$ inverse opal fabrication: a $SiO_2$ sol, which is prepared by mixing tetraethylorthosilicate (TEOS, Sigma-Aldrich), ethanol, and a 0.1 M HCl solution (1:10:1 vol. ratio) with stirring for 6 h, is slowly dripped on a PS opal which is held vertically. After that, the samples are dried at room temperature for 24 h, and then sintered in air at 500° C. for 4 h using a ramp rate of 8° C. min$^{-1}$.

3) Si CVD: The Si layer is deposited by using a static CVD system with disilane ($Si_2H_6$) as the Si source. Initially, the CVD system is evacuated to 10$^{-6}$ mBar, followed by an introduction of 50 mBar of $Si_2H_6$ into the reaction chamber containing the desired sample. After that, the chamber is sealed tightly and heated to 350° C. for 3 h at a ramp rate of 8° C. min$^{-1}$.

4) $SiO_2$ scaffold removal: Because of the dense coating of Si on $SiO_2$, reactive ion etch (RIE, Plasma Therm) using oxygen plasma is utilized to remove a fraction of the top surface of the $SiO_2$@Si to expose the $SiO_2$. A 5% HF in water/ethanol (1:1 vol. ratio) solution is then used to etch the $SiO_2$. The sample is then washed with Millipore water, and dried at 60° C. for 5 h.

5) Graphene deposition: Deposition of graphene onto the Si inverse opal is conducted using a solid precursor CVD method. Poly vinyl alcohol (PVA, Mw=31,000-50,000, Sigma-Aldrich) is dissolved in Millipore water at 90° C. (1 wt. %), and mixed with $FeCl_3.6H_2O$ (Sigma-Aldrich) at a weight ratio of 1:3. After the $FeCl_3.6H_2O$ is completely dissolved, the solution is filtered through a 0.1 μm cellulose acetate syringe filter to remove impurities. The filtrated solution is spin-coated onto Si inverse opals at 3000 rpm for 30 s, and then the samples are dried in a vacuum oven at room temperature for two days. The obtained samples are placed in an Atomate hot-wall CVD system, and heated to 1000° C. in a mix flow of $H_2$ (100 sccm) and Ar (300 sccm) under operating pressure of ~0.5 torr at a 15° C. min$^{-1}$ ramp rate. After that, under the same gas flow, the system is maintained at 1000° C. for 40 min. At last, the samples are cooled to room temperature at a rate of 10° C. min$^{-1}$.

Characterization of Scaffold-Free 3D Porous Electrodes

Samples are characterized using a Hitachi S-4800 SEM, a Hitachi S-4700 SEM equipped with an Oxford INCA EDX analyzer, a Philips X'pert MRD XRD with Cu Kα radiation (1.5418 Å), and a JEOL 2010 LaB6 TEM operating at 200 kV. XRD peaks are compared with standards. FIB is performed using a Helios 600i. Raman spectra are obtained on a Nanophoton Raman-11 Laser Raman Microscope system using a laser power of 1.5 mW at 532 nm.

Electrochemical measurements: Electrochemical measurements of the ~6 μm-thick electrodes are carried out using two-electrode cells with a lithium metal counter and reference electrodes on Princeton Applied Research Model 273A and Biologic VMP3 potentiostats. A non-aqueous electrolyte including 1 M $LiClO_4$ 1:1 ethylene carbonate and dimethylene carbonate is used. All cells are assembled in an Ar-filled glove box. Electrode capacities are measured by a galvanostatic charge-discharge method. For the graphene/$V_2O_5$/graphene cathodes, capacity is measured at various C-rates over the potential range of 2 to 4 V vs. Li. The capacity of graphene/Si/graphene anode is measured at various C-rates over the potential range of 0.005 to 2 V. Electrochemical measurements of the ~100 μm-thick electrodes are performed using coin cells with a $V_2O_5$/graphene/$V_2O_5$ cathode and lithium metal foil as both the anode and reference electrodes and a 1 M $LiPF_6$ 1:1 (w/w) mixture of ethylene carbonate and diethyl carbonate electrolyte. A polypropylene micro-porous film is employed as the separator.

Although the present invention has been described in considerable detail with reference to certain embodiments thereof, other embodiments are possible without departing from the present invention. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages of the invention, and it is not necessarily expected that all of the described advantages will be achieved with every embodiment of the invention.

The invention claimed is:

1. A method of making a scaffold-free 3D porous electrode, the method comprising:
   depositing one or more monolayers of graphene onto a porous scaffold to form a graphene coating on the porous scaffold;
   depositing a first layer of electrochemically active material onto the graphene coating;
   removing the porous scaffold, thereby exposing an underside of the graphene coating;
   depositing a second layer of electrochemically active material onto the underside of the graphene coating, thereby forming a 3D porous electrode comprising a network of interconnected pores, where each pore is surrounded by a multilayer film having a sandwich structure comprising the graphene coating sandwiched between the first and second layers of electrochemically active material.

2. The method of claim 1, wherein, during deposition of the second layer of electrochemically active material onto the underside of the graphene coating, an additional amount of the electrochemically active material is deposited on the first layer.

3. The method of claim 1, further comprising, prior to removing the porous scaffold, heat treating the first layer of electrochemically active material.

4. The method of claim 3, wherein the heat treating comprises heating to a temperature sufficient to induce crystallization and/or sintering of the electrochemically active material.

5. The method of claim 1, wherein depositing the one or more monolayers of graphene comprises chemical vapor deposition, electrochemical deposition, and atomic layer deposition.

6. The method of claim 1, wherein depositing the first layer of electrochemically active material comprises solvothermal deposition, electrochemical deposition or atomic layer deposition.

7. The method of claim 1, wherein removing the porous scaffold comprises etching.

8. The method of claim 1, wherein depositing the second layer of electrochemically active material comprises solvothermal deposition, electrochemical deposition, or atomic layer deposition.

9. The method of claim 1, further comprising heat treating the second layer of electrochemically active material.

10. The method of claim 9, wherein the heat treating comprises heating to a temperature sufficient to induce crystallization and/or sintering of the electrochemically active material.

11. The method of claim 1, wherein the electrochemically active material is selected from the group consisting of: $V_2O_5$, lithiated MnOOH, cobalt oxide, lithium cobalt oxide, lithium nickel cobalt aluminum oxide, lithium nickel manganese cobalt oxide, lithium iron phosphate, lithium vanadium phosphate, vanadium(IV) oxide, and/or iron fluoride, the 3D porous electrode being a 3D porous cathode.

12. The method of claim 1, wherein the electrochemically active material is selected from the group consisting of: silicon, tin, iron oxide, copper oxide, tin oxide, nickel phosphide, titanium oxide, a nickel-tin alloy, and a copper-tin alloy, the 3D porous electrode being a 3D porous anode.

13. A scaffold-free 3D porous electrode comprising:
   a network of interconnected pores, each pore being surrounded by a multilayer film comprising a first layer of electrochemically active material, one or more monolayers of graphene on the first layer of electrochemically active material, and a second layer of electrochemically active material on the one or more monolayers of graphene, the multilayer film thereby having a sandwich structure comprising the one or more monolayers of graphene sandwiched between the first and second layers of electrochemically active material.

14. The scaffold-free 3D porous electrode of claim 13, wherein the multilayer film is not attached to a porous scaffold.

15. The scaffold-free 3D porous electrode of claim 13, wherein adjacent pores comprise shared second layers of electrochemically active material.

16. The scaffold-free 3D porous electrode of claim 13, wherein each of the first and second layers of electrochemically active material comprise a thickness from 5 to 20,000 times greater than the one or more monolayers of graphene.

17. The scaffold-free 3D porous electrode of claim 13, wherein the one or more monolayers of graphene exhibit a uniform thickness having a spatial variation of about 50% or less.

18. The scaffold-free 3D porous electrode of claim 13, wherein each of the first and second layers of electrochemically active material are nanocrystalline.

19. The scaffold-free 3D porous electrode of claim 13, wherein the electrochemically active material is selected from the group consisting of: $V_2O_5$, lithiated MnOOH, cobalt oxide, lithium cobalt oxide, lithium nickel cobalt aluminum oxide, lithium nickel manganese cobalt oxide, lithium iron phosphate, lithium vanadium phosphate, vanadium(IV) oxide, and/or iron fluoride, the 3D porous electrode being a 3D porous cathode.

20. The scaffold-free 3D porous electrode of claim 13, wherein the electrochemically active material is selected from the group consisting of: silicon, tin, iron oxide, copper oxide, tin oxide, nickel phosphide, titanium oxide, a nickel-tin alloy, and a copper-tin alloy, the 3D porous electrode being a 3D porous anode.

21. The scaffold-free 3D porous electrode of claim 13, wherein the electrochemically active material comprises $V_2O_5$, and wherein the scaffold-free 3D porous electrode exhibits a full electrode basis capacity of about 230 mAh g$^{-1}$ at 5 C after 200 cycles.

* * * * *